(12) United States Patent
Lee et al.

(10) Patent No.: US 8,592,701 B2
(45) Date of Patent: Nov. 26, 2013

(54) SWITCH OF CLUTCH PEDAL FOR VEHICLE

(75) Inventors: Hyung Moo Lee, Hwasung-si (KR); Young Je Park, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 209 days.

(21) Appl. No.: 13/188,851

(22) Filed: Jul. 22, 2011

(65) Prior Publication Data

US 2012/0138435 A1 Jun. 7, 2012

(30) Foreign Application Priority Data

Dec. 6, 2010 (KR) .......................... 10-2010-0123713

(51) Int. Cl.
*H01H 3/14* (2006.01)

(52) U.S. Cl.
USPC ...................................................... 200/61.89

(58) Field of Classification Search
USPC ...................................................... 200/61.89
IPC ....................................................... H01H 19/62
See application file for complete search history.

(56) References Cited

U.S. PATENT DOCUMENTS 6,263,758 B1 * 7/2001 Kumamoto et al. ............ 74/513
6,633,013 B2 * 10/2003 Nishimura et al. ............ 200/559

FOREIGN PATENT DOCUMENTS

| JP | 09-185927 A | 7/1997 |
| JP | 2006-214477 A | 8/2006 |
| KR | 10-2006-0070878 A | 6/2006 |

* cited by examiner

*Primary Examiner* — Vanessa Girardi
(74) *Attorney, Agent, or Firm* — Morgan, Lewis & Bockius LLP

(57) ABSTRACT

A clutch pedal switch for a vehicle may include a switch body on which a first fixed contact point and a second fixed contact point are formed with a predetermined distance therebetween, a first elastic member disposed around the first fixed contact point to apply elastic force to the first fixed contact point, and a first operation contact point is formed to selectively contact the first fixed contact point, a second elastic member disposed around the second fixed contact point to apply elastic force in the second fixed contact point direction, and a second operation contact point is formed to selectively contact the second fixed contact point, a rotating member disposed between the first fixed contact point and the second fixed contact point and is rotated by rotation of a pedal to apply force to the first elastic member and the second elastic member such that the first and second fixed contact points selectively contact the first and second operation contact points, and a terminal connected to the first elastic member and the second elastic member to transfer a contact signal of the first and second fixed contact points with the first and second operation contact points.

3 Claims, 11 Drawing Sheets

SWITCH OF CLUTCH PEDAL FOR VEHICLE

CROSS-REFERENCE TO RELATED APPLICATION

This application claims priority to and the benefit of Korean Patent Application No. 10-2010-0123713 filed Dec. 6, 2010, the entire contents of which application is incorporated herein for all purposes by this reference.

BACKGROUND OF INVENTION

1. Field of Invention

The present invention relates to a clutch pedal switch. More particularly, the present invention relates to a clutch pedal switch with a simple structure for a vehicle.

2. Description of Related Art

Generally, an ignition lock switch and a neutral switch are separately disposed in a clutch pedal of a vehicle, which are operated according to operation of the clutch pedal.

The ignition lock is used to prevent starting of an engine in a case that a clutch pedal is not operated, and the neutral switch detects whether the clutch pedal is completely operated.

Further, the detected signals of the ignition lock switch and the neutral switch are input to a control unit of a vehicle to electrically control the engine.

However, the ignition lock switch and the neutral switch are hit by an arm of the clutch pedal so as to sense movement of the pedal in a conventional structure, and there is a problem of noise generation in this hit operation. Also, since the ignition lock switch and the neutral switch are separately disposed, there is a problem that the structure becomes complicated and manufacturing cost is increased.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a clutch pedal switch for a vehicle having advantages of preventing noise and realizing a simple structure by eliminating an ignition lock switch and a neutral switch in exemplary embodiments of the present invention.

A clutch pedal switch for a vehicle may include a switch body on which a first fixed contact point and a second fixed contact point are formed with a predetermined distance therebetween, a first elastic member that is disposed around the first fixed contact point to apply elastic force to the first fixed contact point, and a first operation contact point is formed to selectively contact the first fixed contact point, a second elastic member that is disposed around the second fixed contact point to apply elastic force in the second fixed contact point direction, and a second operation contact point is formed to selectively contact the second fixed contact point, a rotating member that is disposed between the first fixed contact point and the second fixed contact point and is rotated by rotation of a pedal to apply force to the first elastic member and the second elastic member such that the first and second fixed contact points selectively contact the first and second operation contact points, and a terminal that is connected to the first elastic member and the second elastic member to transfer a contact signal of the first and second fixed contact points with the first and second operation contact points.

The rotating member may include a first rotating portion in which an oblong hole in which a catching protrusion of the pedal moves along is formed and is rotated by rotation torque of the pedal, and a second rotating portion that is rotated together with the first rotating portion and applies force to the first and second elastic members.

The second rotating portion may include a rotating body that is connected to the first rotating portion, and a press protruding portion that protrudes on a side surface of the rotating body and applies a force overcoming an elastic force of the first and second elastic members.

The press protruding portion may include a seat protrusion that protrudes to have a round shape along the outside of the rotating body and the first elastic member and on which the second elastic member is seated, a first slanting portion that is formed on one side of the seat protrusion and the first elastic member slides thereon during rotation of the rotating body, and a second slanting portion that is formed in the other side of the seat protrusion and the second elastic member slides thereon during rotation of the rotating body.

The first elastic member may be positioned at the outside of the seat protrusion such that the first fixed contact point and the first operation contact point contact each other, the second elastic member is positioned at the upper side of the seat protrusion such that the second fixed contact point and the second operation contact point are separated in an idle condition of the pedal stroke, the first elastic member is positioned on the first slanted surface such that the first fixed contact point and the first operation contact point are separated, the second elastic member is positioned on the second slanted surface such that the second fixed contact point and the second operation contact point are separated in a 50% stroke of the pedal, the first elastic member is positioned on the seat protrusion such that the first fixed contact point and the first operation contact point are separated, and the second elastic member is positioned at the outside of the seat protrusion such that the second fixed contact point and the second operation contact point contact in a range higher than 85% of a stroke of the pedal.

Noise does not occur in an operation process, and manufacturing cost is saved by eliminating the ignition lock switch and the neutral switch according to various embodiments of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7A is a top plan view showing an operational condition of an exemplary vehicle clutch pedal switch in a 85% actuated condition of a total stroke of a vehicle clutch pedal.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
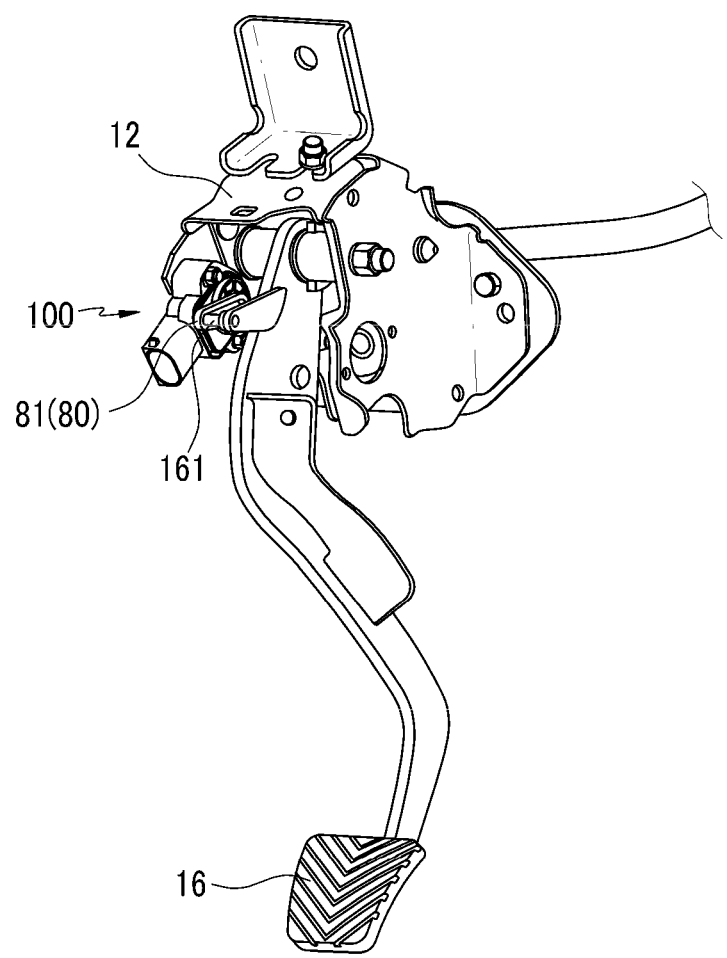
FIG. 1 is a perspective view showing mounting of an exemplary clutch pedal switch for a vehicle according to the present invention.
Figure 2:
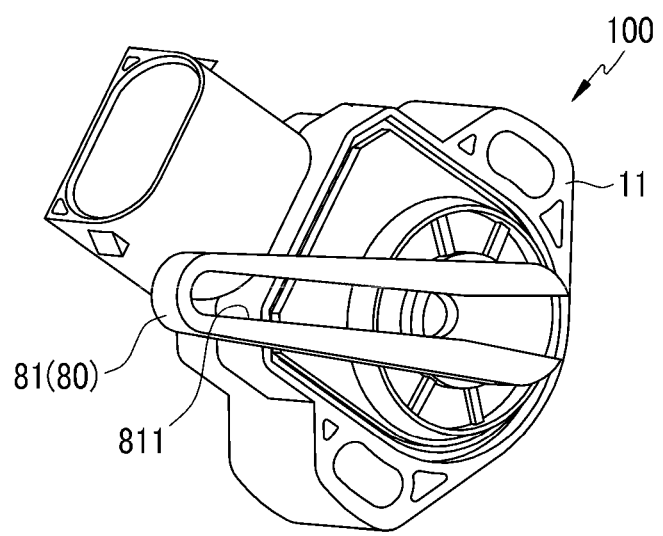
FIG. 2 is a perspective view showing a clutch pedal switch for a vehicle of FIG. 1.
Figure 3:
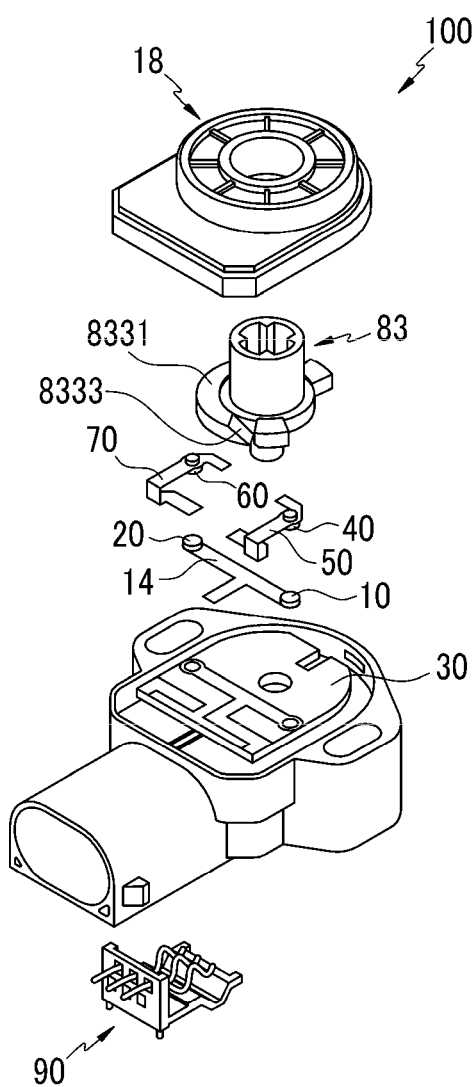
FIG. 3 is an exploded perspective view showing a disassembled clutch pedal switch for a vehicle of FIG. 2.

As shown in FIG. 1 to FIG. 3, a clutch pedal switch 100 for a vehicle according to various embodiments of the present invention includes a switch body 30 that is disposed in a housing 11 and first and second fixed contact points 10 and 20 that are formed thereon, a first elastic member 50 on which a first operation contact point 40 is formed and that selectively contacts the first fixed contact point 10, a second elastic member 70 on which a second operation contact point 60 is formed and that selectively contacts the second fixed contact point 20, a rotating member 80 that controls contact of the first and second operation contact points 40 and 60 with the first and second fixed contact points 10 and 20, and a terminal 90 that transfers a contact signal of the first and second operation contact points 40 and 60 with the first and second fixed contact points 10 and 20. Reference number 18 denotes a cover that is combined with the housing 11.

The switch body 30 is disposed in the housing 11 of a vehicle body 12. First and second fixed contact points 10 and 20 are formed to protrude from the switch body 30. The first and second fixed contact points 10 and 20 can be separately formed at one side and the other side of the switch body 30. The first and second fixed contact points 10 and 20 are connected to the terminal 90 through a conductive plate 14. A process of transferring a signal to the terminal 90 that explains a sensing operation of the first and second operation contact points 40 and 60 with the first and second fixed contact points 10 and 20 will now be described. The first and second elastic members 50 and 70 are formed at a position where the first and second fixed contact points 10 and 20 are formed.

The first elastic member 50 is disposed near the first fixed contact point 10. One end of the first elastic member 50 is fixed near the first fixed contact point 10 and the other end is bent to be extended toward the first fixed contact point 10. The first operation contact point 40 that protrudes toward the first fixed contact point 10 is disposed on the first elastic member 50. Accordingly, if an external force is not applied to the first elastic member 50, the first fixed contact point 10 and the first operation contact point 40 contact each other by an elastic force of the first elastic member 50.

The second elastic member 70 is disposed near the second fixed contact point 20. One end of the second elastic member 70 is fixed near the second fixed contact point 20 and the other end is extended toward the second fixed contact point 20. The second operation contact point 60 that protrudes toward the second fixed contact point 20 is disposed on the second elastic member 70. Accordingly, if an external force is not applied to the second elastic member 70, the second fixed contact point 20 and the second operation contact point 60 contact each other by an elastic force of the second elastic member 70.

Separation of the first and second fixed contact points 10 and 20 and the first and second operation contact points 40 and 60 that are described above can be realized by rotation of the rotating member 80.

The rotating member 80 between the first fixed contact point 10 and the second fixed contact point 20 is rotated by a pedal 16. The rotating member 80 selectively applies force to the first elastic member 50 and the second elastic member 70 during the rotation so the first and second fixed contact points 10 and 20 contact the first and second operation contact points 40 and 60.

Figure 4:
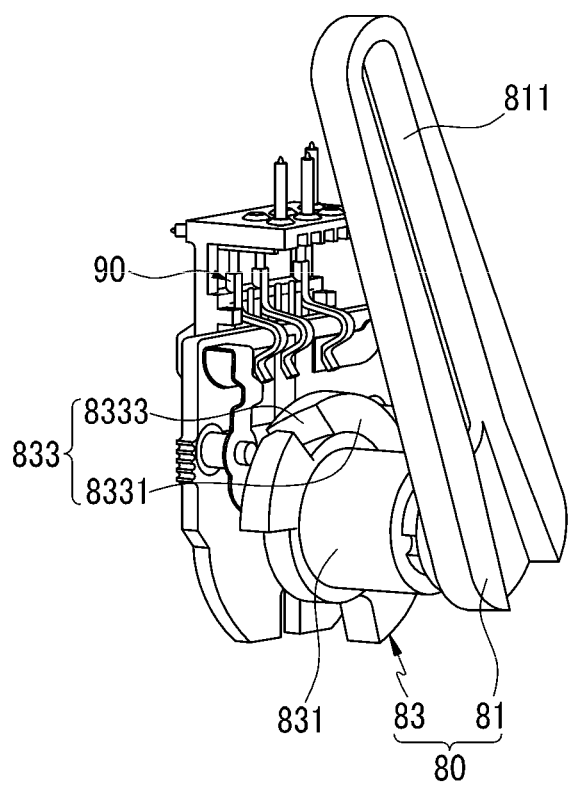
FIG. 4 is a perspective view showing an exemplary clutch pedal switch for a vehicle without a housing.
Figure 5:
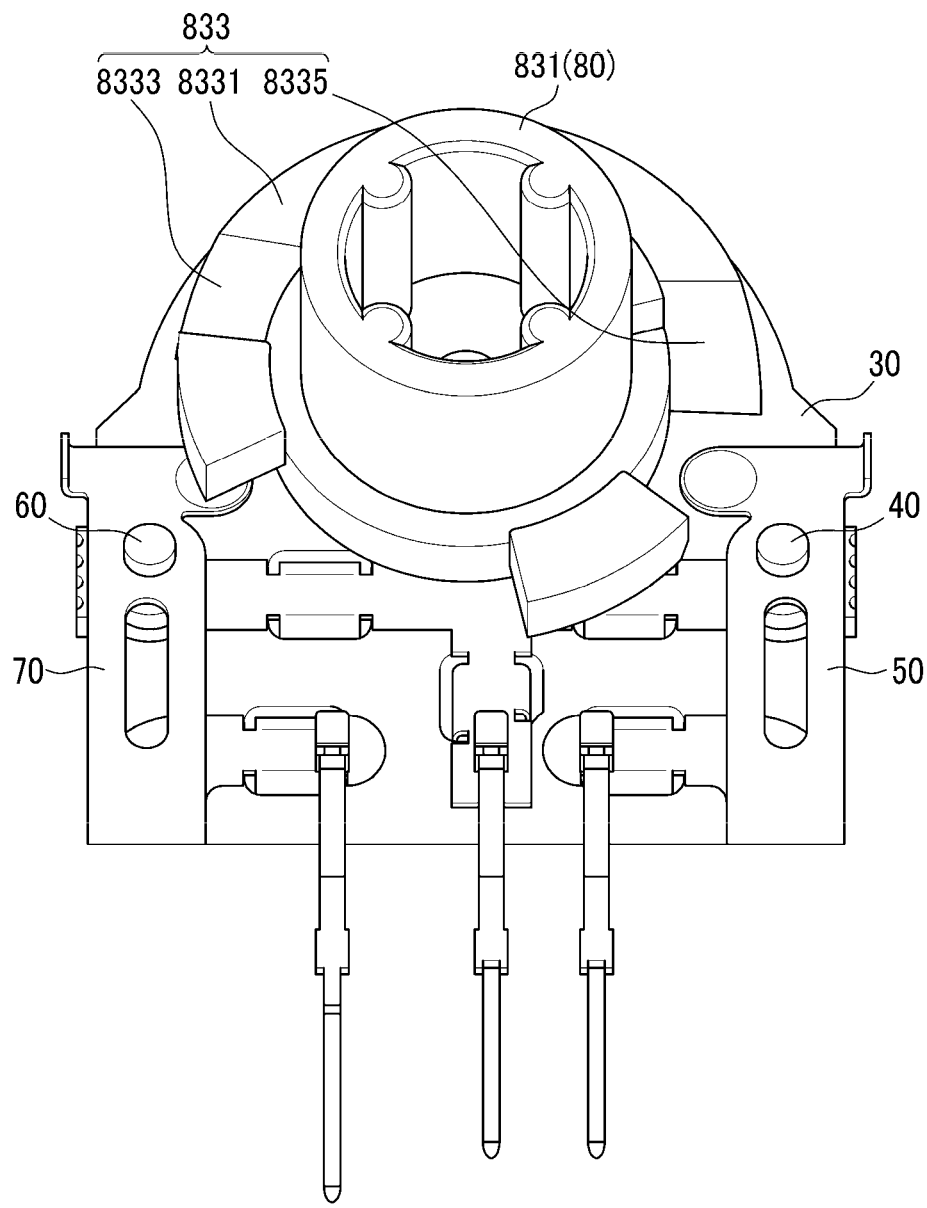
FIG. 5 is a perspective view showing a clutch pedal switch for a vehicle of FIG. 4 without a first rotating portion.

With reference to FIG. 4 and FIG. 5, the rotating member 80 includes a first rotating portion 81 that receives torque of the pedal 16 and a second rotating portion 83 that combines with the first rotating portion 81 to be rotated thereby and applies force to the first and the second elastic members 50 and 70.

The first rotating portion 81 is used to transfer torque of the pedal 16 to the second rotating portion 83, and an oblong hole 811 is formed therein in a length direction thereof. That is, a protruding portion 161 is formed on the pedal 16, and the protruding portion 161 is inserted into the oblong hole 811 of the first rotating portion 81. Accordingly, if the pedal 16 is rotated by a step force of a driver, torque is applied to the first rotating portion 81 as the protruding portion 161 slides in the hole 811. The torque of the first rotating portion 81 is transferred to the second rotating portion 83. The first rotating portion 81 can be integrally or monolithically formed with the second rotating portion 83, or they can be assembled by forcible insertion. The first rotating portion 81 and the second rotating portion 83 are assembled by forcible insertion in various embodiments.

The second rotating portion 83 includes a rotating body 831 that is connected to the first rotating portion 81, and a press protruding portion 833 that protrudes on a side surface of the rotating body 831 and applies a force overcoming elastic force of the first and second elastic members 50 and 70.

The rotating body 831 protrudes in a cylindrical shape to be connected to the first rotating portion 81. The rotating body 831 and the first rotating portion 81 can be coupled or decoupled through force.

The press protruding portion 833 can protrude at a side surface of the rotating body 831 with a round shape. More specifically, the press protruding portion 833 includes a seat protrusion 8331 that protrudes in a round shape along the outside of the rotating body 831, a first slanting portion 8333 that is formed at one side of the seat protrusion 8331, and a second slanting portion 8335 that is formed at the other side of the seat protrusion 8331.

The seat protrusion 8331 is a part where the first elastic member 50 and the second elastic member 70 are selectively seated according to rotation of the rotating member 80. If the first elastic member 50 is positioned on the seat protrusion 8331, the first fixed contact point 10 and the first operation contact point 40 are separated without contact. Further, if the second elastic member 70 is positioned on the seat protrusion 8331, the second fixed contact point 20 and the second operation contact point 60 are separated without contact.

The first slanting portion 8333 denotes a portion where an end portion of the first elastic member 50 slides according to rotation of the rotating member 80. More specifically, the first slanting portion 8333 denotes a portion that guides the first elastic member 50 such that the end portion thereof is positioned on the seat protrusion 8331 or leaves the seat protrusion 8331 during rotation of the rotating member 80 in one direction or the other.

The second slanting portion 8335 denotes a part where an end portion of the second elastic member 70 slides according to rotation of the rotating member 80. More specifically, the second slanting portion 8335 denotes a portion that guides the second elastic member 70 such that the end portion thereof is positioned on the seat protrusion 8331 or leaves the seat protrusion 8331 during rotation of the rotating member 80 in one direction or the other.

Figure 6A:
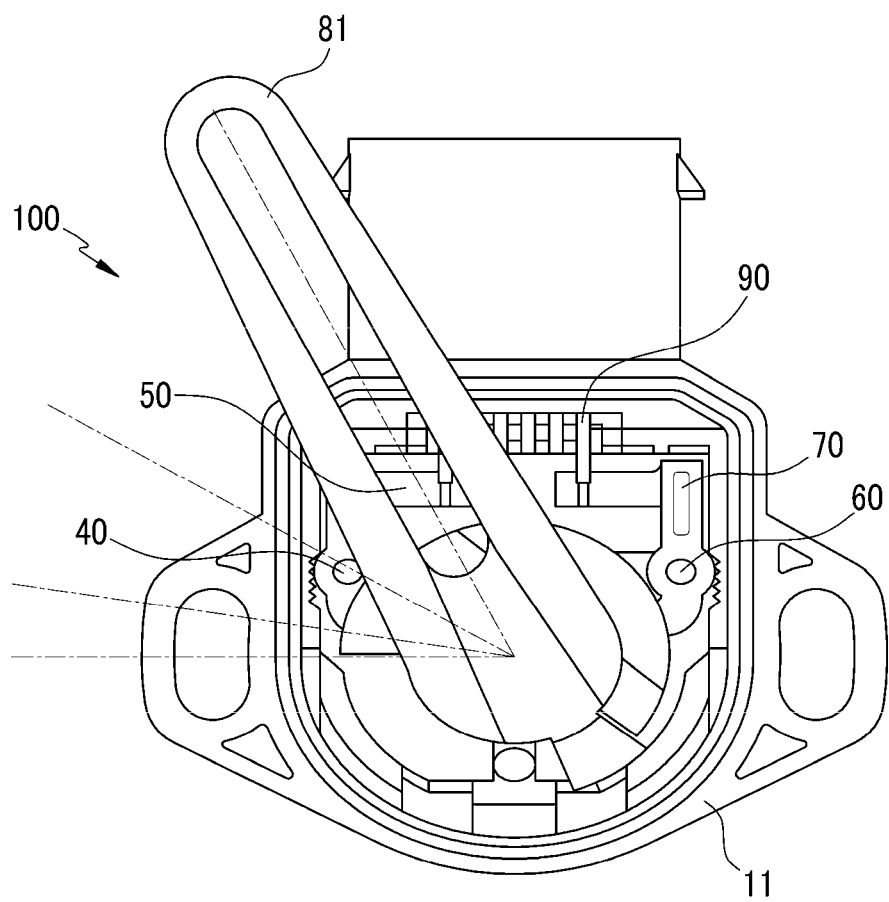
FIG. 6A is a top plan view showing an operational condition of an exemplary vehicle clutch pedal switch in an idle condition thereof.

As described above, the rotating member 80 applies a force to the first elastic member 50 or the second elastic member 70 such that the first elastic member 50 and the second elastic member 70 selectively contact the first and second fixed contact points 20. This is used to selectively transmit an operating signal of the clutch pedal 16 to an electronic control unit (ECU). Referring to FIG. 6A and FIG. 8B, this will be described as follows.

Figure 6B:
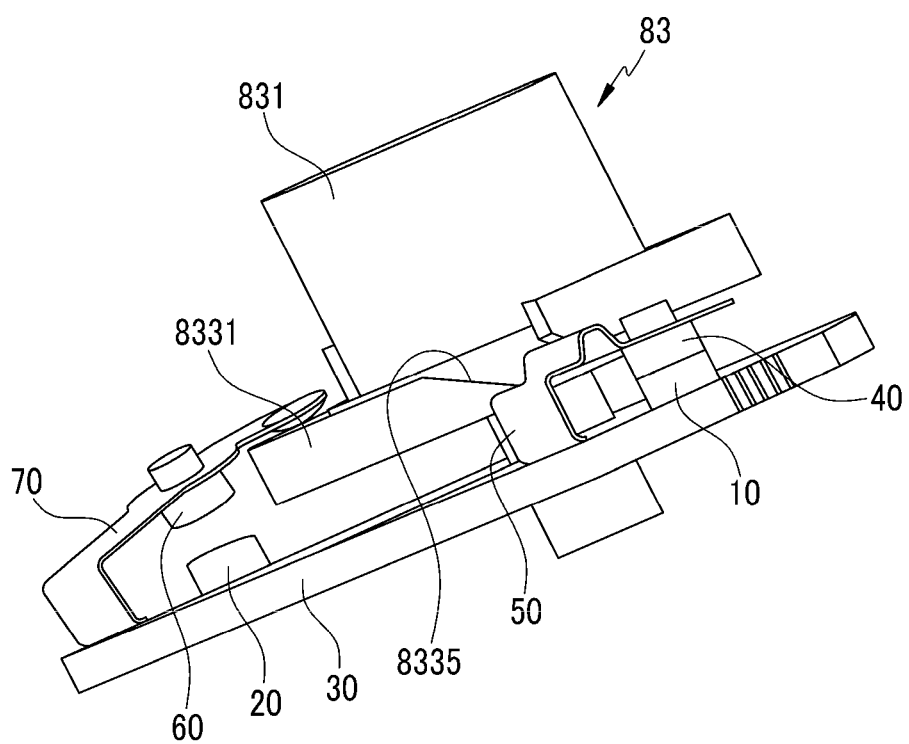
FIG. 6B is a side view showing an operational condition of a vehicle clutch pedal of FIG. 6A.

As shown in FIG. 6A and FIG. 6B, the first elastic member 50 is positioned outside of the seat protrusion 8331 such that the first fixed contact point 10 and the first operation contact point 40 contact each other in an idle condition of a vehicle idle. Further, the second elastic member 70 is positioned on an upper side of the seat protrusion 8331 such that the second fixed contact point 20 and the second operation contact point 60 are separated. Output of an engine is transferred to a transmission of the vehicle in this condition.

Figure 7A:
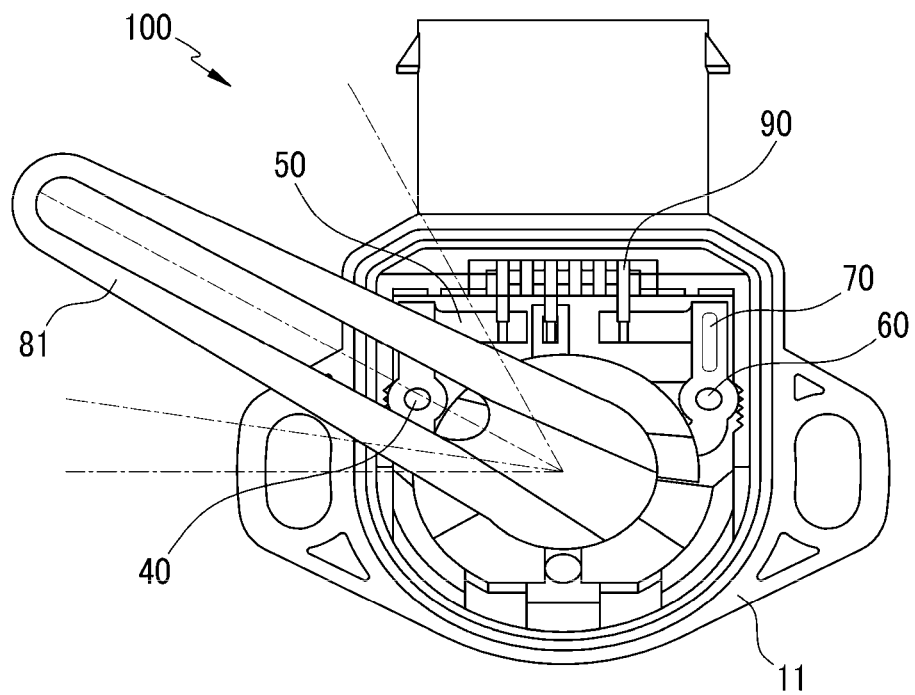
FIG. 7A is a top plan view showing an operational condition of an exemplary vehicle clutch pedal switch in a 50% actuated condition of a total stroke of a vehicle clutch pedal.
Figure 7B:
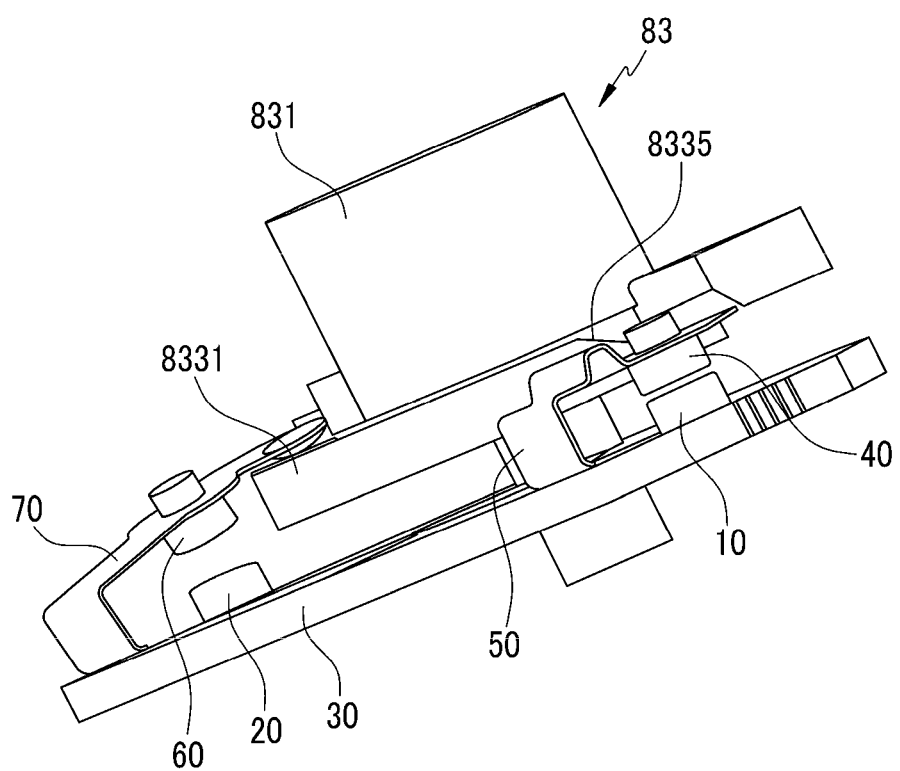
FIG. 7B is a side view showing an operational condition of an exemplary vehicle clutch pedal of FIG. 7A.

As shown in FIG. 7A and FIG. 7B, in a condition in which a vehicle clutch pedal 16 is rotated by a force as much as a 50% of a total stroke, the first elastic member 50 is positioned on the first slanting portion 8333 such that the first fixed contact point 10 and the first operation contact point 40 are separated. Further, the second elastic member 70 is positioned on the second slanting portion 8335 such that the second fixed contact point 20 and the second operation contact point 60 are separated. Output of the engine is not transferred to the transmission of the vehicle in this condition.

Figure 8A:
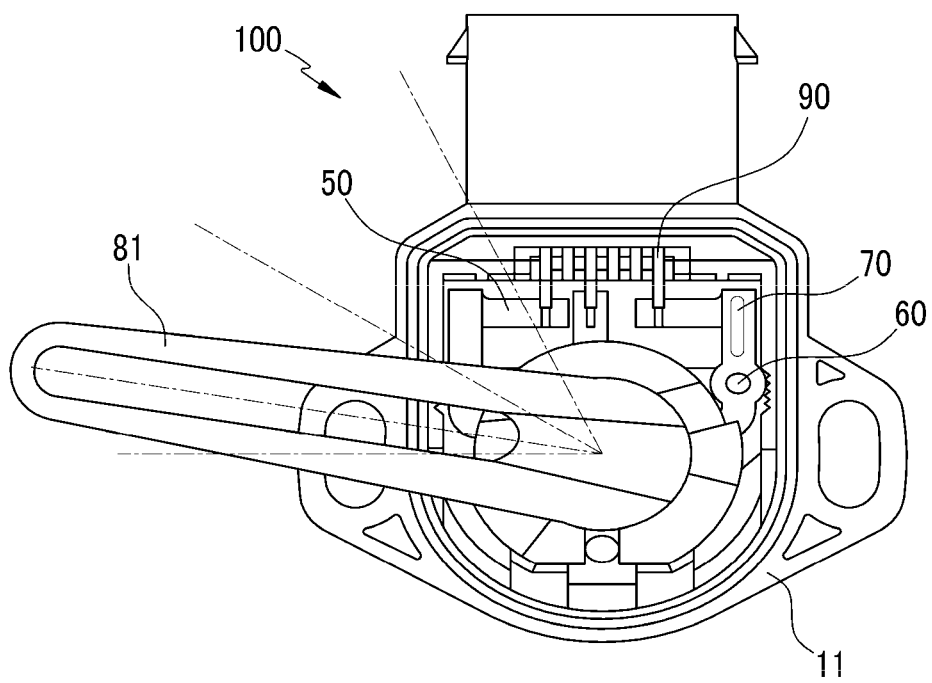
FIG. 8B is a side view showing an operational condition of a vehicle clutch pedal of FIG. 8A.
Figure 8B:
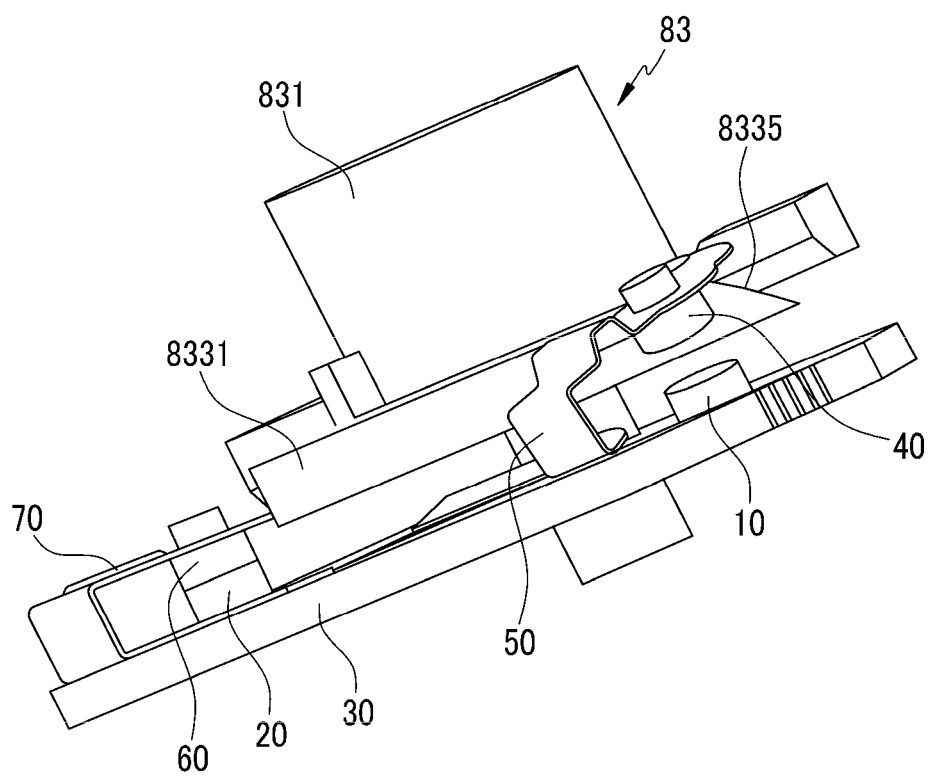

FIG. 7A is a top plan view showing an operational condition of a vehicle clutch pedal switch in a 85% condition of a total stroke of a vehicle clutch pedal, and FIG. 8B is a side view showing an operational condition of the vehicle clutch pedal of FIG. 8A.

As shown in FIG. 8A and FIG. 8B, in a condition in which a vehicle clutch pedal is operated more than 85% of a total stroke, the first elastic member 50 is positioned on the seat protrusion 8331 such that the first fixed contact point 10 is separated from the first operating contact point 40. Also, the second elastic member 70 is positioned outside of the seat protrusion 8331 such that the second fixed contact point 20 contacts the second operation contact point 60. This is a condition in which an ignition lock of the vehicle is released, wherein starting of the engine is enabled.

As described in various embodiments of the present invention, the first and second elastic members 70 are selectively lifted by a force of the first and second slanting portions 8335 according to a rotation angle of the rotating member 80 in the vehicle clutch pedal switch of the present invention. Accordingly, the rotating member 80 rotates such that the first and second fixed contact points 10 and 20 selectively contact the first and second operation contact points 40 and 60, and therefore a clutch sensor becomes simple.

For convenience in explanation and accurate definition in the appended claims, the terms upper and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch pedal switch for a vehicle, comprising:
    a switch body including a first fixed contact point and a second fixed contact point spaced a predetermined distance therebetween;
    a first elastic member disposed around the first fixed contact point to apply elastic force to the first fixed contact point, and a first operation contact point selectively contacting the first fixed contact point;
    a second elastic member disposed around the second fixed contact point to apply elastic force in the second fixed contact point direction, and a second operation contact point selectively contacting the second fixed contact point;
    a rotating member disposed between the first fixed contact point and the second fixed contact point and is rotated by rotation of a pedal to apply force to the first elastic member and the second elastic member such that the first and second fixed contact points selectively contact the first and second operation contact points; and
    a terminal connected to the first elastic member and the second elastic member to transfer a contact signal of the first and second fixed contact points with the first and second operation contact points;
    wherein the rotating member includes:
        a first rotating portion including an oblong hole moveably receiving a catching protrusion of the pedal and rotated by rotation torque of the pedal; and
        a second rotating portion rotated together with the first rotating portion and applies force to the first and second elastic members; and
    wherein the second rotating portion includes:
        a rotating body connected to the first rotating portion; and
        a press protruding portion that protrudes on a side surface of the rotating body and applies a force overcoming an elastic force of the first and second elastic members.

2. The clutch pedal switch of claim 1, wherein the press protruding portion includes:
    a seat protrusion that protrudes with a round shape along the outside of the rotating body and the first elastic member, and on which the second elastic member is seated;

a first slanting portion formed on one side of the seat protrusion and the first elastic member slides thereon during rotation of the rotating body; and a second slanting portion formed in the other side of the seat protrusion and the second elastic member slides thereon during rotation of the rotating body.

3. The clutch pedal switch of claim 2, wherein:

the first elastic member is positioned at the outside of the seat protrusion such that the first fixed contact point and the first operation contact point contact each other;

the second elastic member is positioned at the upper side of the seat protrusion such that the second fixed contact point and the second operation contact point are separated in an idle condition of the pedal stroke;

the first elastic member is positioned on the first slanted surface such that the first fixed contact point and the first operation contact point are separated;

the second elastic member is positioned on the second slanted surface such that the second fixed contact point and the second operation contact point are separated in a 50% stroke of the pedal;

the first elastic member is positioned on the seat protrusion such that the first fixed contact point and the first operation contact point are separated; and the second elastic member is positioned at the outside of the seat protrusion such that the second fixed contact point and the second operation contact point contact in a range higher than 85% of a stroke of the pedal.

\* \* \* \* \*